United States Patent
Jalali et al.

(10) Patent No.: US 11,699,209 B2
(45) Date of Patent: Jul. 11, 2023

(54) METHOD AND APPARATUS FOR EMBEDDING AND EXTRACTING DIGITAL WATERMARKING FOR NUMERICAL DATA

(71) Applicant: HUAWEI CLOUD COMPUTING TECHNOLOGIES CO., LTD., Gui Zhou Province (CN)

(72) Inventors: Roozbeh Jalali, Toronto (CA); Haolin Guo, Markham (CA); Michael Chih Hung Li, Markham (CA); Zanqing Zhang, Markham (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 156 days.

(21) Appl. No.: 17/077,268

(22) Filed: Oct. 22, 2020

(65) Prior Publication Data

US 2022/0130008 A1 Apr. 28, 2022

(51) Int. Cl.
*G06K 9/00* (2022.01)
*G06T 1/00* (2006.01)

(52) U.S. Cl.
CPC .......... *G06T 1/0028* (2013.01); *G06T 1/0092* (2013.01); *G06T 2201/0061* (2013.01)

(58) Field of Classification Search
CPC ..... G06T 1/0021; G06T 1/0042; G06T 1/005; G06T 1/0028; G06T 1/0092; G06T 2201/006; G06T 2201/0061; G06F 21/64; G06F 21/16; H04L 9/00; G09C 5/00
See application file for complete search history.

(56) References Cited

U.S. PATENT DOCUMENTS

| 6,314,192 | B1 * | 11/2001 | Chen | H04N 1/32251 |
| | | | | 382/100 |
| 8,166,302 | B1 * | 4/2012 | Shih | H04L 9/0894 |
| | | | | 713/180 |
| 10,354,355 | B2 * | 7/2019 | Chalamala | G06T 1/005 |
| 11,380,341 | B2 * | 7/2022 | Ravelli | H03M 7/6005 |
| 2005/0018845 | A1 * | 1/2005 | Suzaki | G06T 1/0028 |
| | | | | 380/243 |
| 2007/0172094 | A1 * | 7/2007 | Ho | G06T 1/005 |
| | | | | 382/100 |
| 2008/0130883 | A1 * | 6/2008 | Agaian | G09C 5/00 |
| | | | | 380/54 |

(Continued)

FOREIGN PATENT DOCUMENTS

| CN | 109840401 A | 6/2019 |
| CN | 111010490 A | 4/2020 |
| KR | 20050081007 A | 8/2005 |

*Primary Examiner* — Shervin K Nakhjavan

(57) ABSTRACT

There is provided a method for embedding a digital watermark into and extracting a digital watermark from a numerical data set. In accordance with embodiments of the present disclosure, there is provided a method for embedding a digital watermark into a numerical data set. The method includes selecting portions of the numerical data set identified as data noise, the selected portions to be used for embedding the digital watermark into the numerical data set, the digital watermark being unique for each recipient of the numerical data. The method further includes replacing the least significant bit (LSB) of at least some of the selected portions of the numerical data set with at least portion of the digital watermark.

16 Claims, 6 Drawing Sheets

(56) References Cited

U.S. PATENT DOCUMENTS

| | | | |
|---|---|---|---|
| 2010/0177891 A1* | 7/2010 | Keidar | G06T 1/0021 |
| | | | 375/E7.026 |
| 2013/0022230 A1 | 1/2013 | Tadano | |
| 2018/0103050 A1* | 4/2018 | Mason | H04L 63/168 |
| 2021/0099307 A1* | 4/2021 | Rolf | H04L 9/0643 |
| 2021/0279306 A1* | 9/2021 | Li | G06F 21/64 |

* cited by examiner

METHOD AND APPARATUS FOR EMBEDDING AND EXTRACTING DIGITAL WATERMARKING FOR NUMERICAL DATA

CROSS REFERENCE TO RELATED APPLICATIONS

This is the first patent application for the instant technology.

FIELD OF THE INVENTION

In recent years, the amount of data created and used is rapidly increasing and several big data platforms have become more extensively used in many places. Upon the proliferation of digital data, there has been a growing conc

BACKGROUND

In recent years, the amount of data created and used is rapidly increasing and several big data platforms have become more extensively used in many places. Upon the proliferation of digital data, there has been a growing concern for data security. To address the data security concern, it has become necessary to identify the source of the content and proving the ownership of the digital data. It has also become necessary to trace accesses and changes to the data and to prevent data leakage throughout the entire lifecycle of data sharing between different parties. Further, the quality and usefulness of the data still needs to be preserved for the purpose of data analysis. It is understood that data analysis, whether using traditional statistical approaches or recent machine learning based approaches, requires a high degree of data integrity. It is understood that even a minor change to data content can render a significantly different analysis result.

To address the data security concerns, digital watermarking has typically been applied to multimedia files containing image, audio, video or other types of media data. Digital watermarking is a technique which includes embedding particular information into digital data to be processed by a predetermined process. Digital watermarking can enable the identification of copyright information (e.g. identifying copyright ownership), user information, identification information and other information related to that digital data. Digital watermarking can also provide for the protection of the copyright by tracing illicit uses and/or copies of the digital data. Digital watermarking can further provide data provenance, data traceability, data usefulness and data quality.

Existing research for digital watermarking has primarily focused on document-level watermarking or file-level digital watermarking. For instance, the digital watermark data is embedded into a digital file, thereby watermarking the entire file, prior to transferring the file to other entity. The algorithms for file-level digital watermarking are quite mature for both embedding and extracting phases. However, file-level digital watermarking is vulnerable to attacks like subset attacks. For instance, one can simply copy and leak a subset of the original data set without damaging the file-level digital watermark.

Another type of existing digital watermarking technique is cell-level database digital watermarking. In the cell-level database digital watermarking, the digital watermark is embedded into the structured data cells. Using the cell-level database watermarking technique, the digital watermark becomes hard to break by copying and leaking the subset of the original data set. However, the cell-level database digital watermarking is still vulnerable to some attacks like deletion and alternation attacks. Existing algorithms for the cell-level database digital watermarking depend on primary key attributes of the data, which, in particular, can be vulnerable to deletion and alteration attacks. A deletion attack can occur when a threat actor tries to delete part of original data set and an alteration attack occurs when a threat actor tries to modify some records or data to destroy or remove the digital watermark from the watermarked original data set.

Therefore, there is a need for a method and apparatus for embedding a digital watermark into and extracting a digital watermark from numerical data, that is not subject to one or more limitations of the prior art. In particular, there has not been research conducted on digital watermarking for structured numerical data or textual data for the purpose of preventing data tampering and security breaches.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for embedding a digital watermark into and extracting a digital watermark from numerical data. In accordance with embodiments of the present disclosure, there is provided a method for embedding a digital watermark into a numerical data set, wherein the numerical data set is for distribution to a plurality of recipients. The method includes selecting portions of the numerical data set identified as data noise, the selected portions to be used for embedding the digital watermark into the numerical data set, the digital watermark being unique for each of the plurality of recipients. The method further includes replacing the least significant bit (LSB) of at least some of the selected portions of the numerical data set with at least portion of the digital watermark.

In accordance with embodiments of the present disclosure, there is provided an apparatus for embedding a digital watermark into a numerical data set, wherein the numerical data set is for distribution to a plurality of recipients. The apparatus including a processor and a memory storing machine executable instructions thereon, the machine executable instructions, when executed by the processor cause the apparatus to be configured to select portions of the numerical data set identified as data noise, the selected portions to be used for embedding the digital watermark into the numerical data set, the digital watermark being unique for each of the plurality of recipients. The machine executable instructions when executed by the processor further configure the apparatus to replace the least significant bit (LSB) of at least some of the selected portions of the numerical data set with at least portion of the digital watermark.

In accordance with embodiments of the present disclosure, there is provided a method for extracting a digital watermark from a digitally watermarked numerical data set, wherein the numerical data set was distributed to a plurality of recipients. The method includes selecting portions of the digitally watermarked numerical data set identified as data noise, the selected portions to be used for extracting the digital watermark from the digitally watermarked numerical data set, the digital watermark being unique for each of the plurality of recipients. The method further includes extracting at least a portion of the digital watermark from the least significant bit (LSB) of the selected portions of the digitally watermarked numerical data set.

In accordance with embodiments of the present disclosure, there is provided an apparatus for extracting a digital watermark into a numerical data set, wherein the numerical data set was distributed to a plurality of recipients. The apparatus including a processor and a memory storing machine executable instructions thereon, the machine executable instructions, when executed by the processor cause the apparatus to be configured to select portions of the digitally watermarked numerical data set identified as data noise, the selected portions to be used for extracting the digital watermark from the digitally watermarked numerical data set, the digital watermark being unique for each of the plurality of recipients. The machine executable instructions, when executed by the processor further cause the apparatus to be configured to extract at least a portion of the digital watermark from the least significant bit (LSB) of the selected portions of the digitally watermarked numerical data set.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present disclosure may provide a method and apparatus for digital watermarking for numerical data that may prevent and trace data leakage and may provide copyright protection throughout the lifecycle of the data. According to embodiments, there may be a limited impact on the original data thereby preserving data usability. Also, the method and apparatus of digital watermarking according to the present disclosure may only add noise data to the original data set thereby preserving the usefulness and quality of the data. Further, embodiments of the method and apparatus for digital watermarking may tolerate a primary deletion attack as the digital watermarking does not depend on an individual primary key. According to embodiments, the capacity of the method and apparatus for digital watermarking can be significantly increased due to a large number of unique digital watermarks that can be generated. In some embodiments there may be up to about 4 billion unique digital watermarks. According to embodiments, the extraction process for removing the digital watermarking can be a blind extraction such that the embedded digital watermark may be extracted without requiring the original data for the extraction of the digital watermark.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
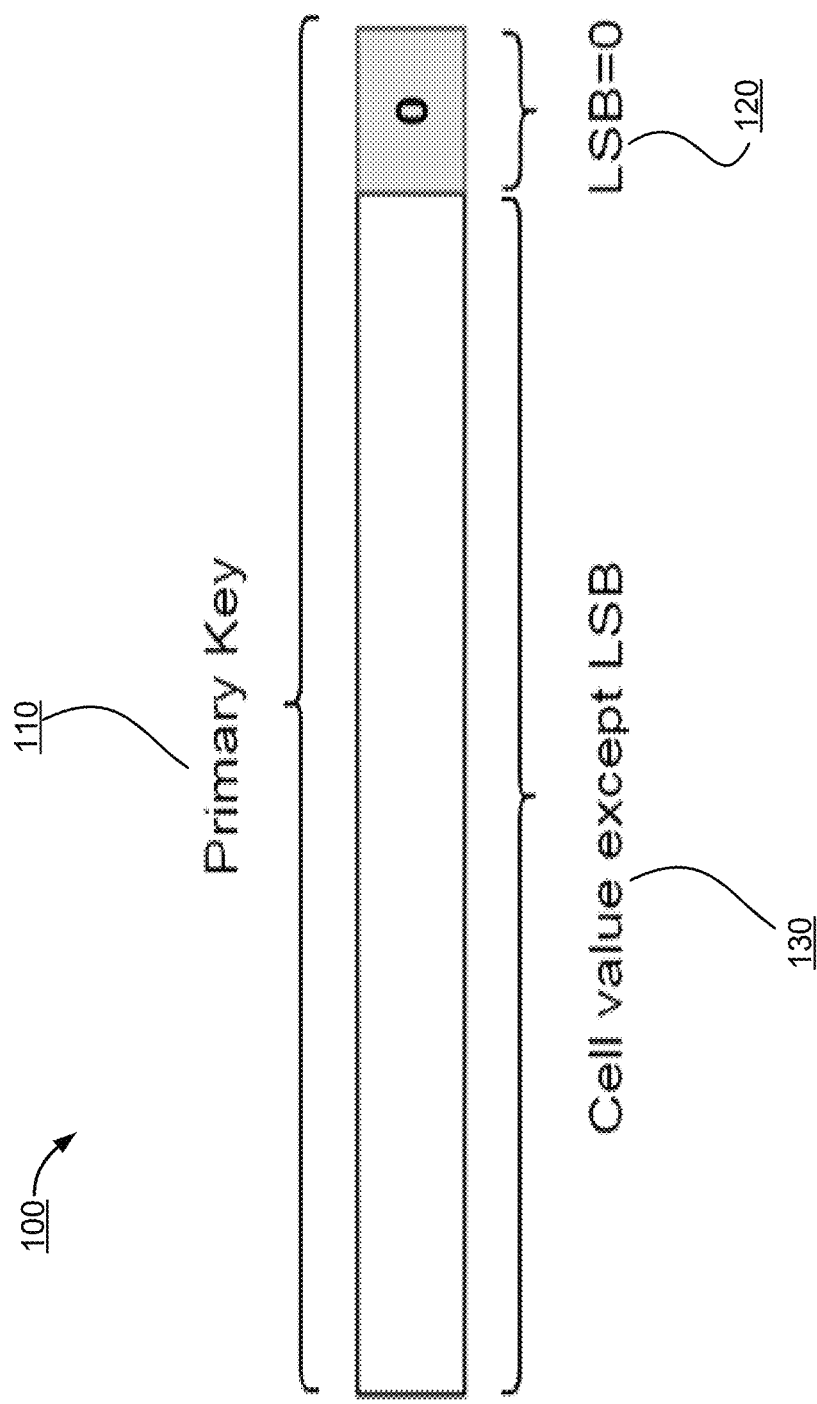
FIG. 1 illustrates an example structure of a primary key for the cell, in accordance with embodiments.

Embodiments of the present disclosure provide a method and apparatus for embedding a digital watermark into and extracting a digital watermark from structured numerical data. According to embodiments, the digital watermark is embedded into the numerical values by changing a limited portion of the data set row. The digital watermark embedded in the numerical data may be essentially invisible and robust to typical digital watermark attacks such as subset attack, deletion attack, alteration attack and re-type attack, while preserving usefulness and quality of data for the purpose of data analysis. In various embodiments, the digital watermarks embedded can be extracted in a blind manner, thereby extraction can be performed without the use of the original dataset.

Digital watermarking techniques include textual data watermarking methods such as syntactic and semantic methods. Syntactic watermarking methods work on the syntactic structure of sentences. Syntactic watermarking methods transform the structure of the sentences (e.g. rearranging the order of words in sentences) to hide the digital watermark in the textual data. Typically, the syntactic methods are processed by building a syntactic tree that contains hierarchies and functional dependencies of the text and applying a transformation process to the syntactic tree in order to embed the digital watermarks. Semantic watermarking methods work on the semantic structure of sentences, and use some methods (e.g. synonym substitution, error typing) to preserve the original meaning of the text while embedding the digital watermark into the textual data. There are other techniques that can be used for analyzing both the syntactic and the semantic structure of text, such as natural language processing (NLP).

Both syntactic and semantic watermarking methods can be suitable for unstructured texts and sentences. Both the syntactic and semantic methods require an understanding of the syntactic or semantic structure of the texts and sentences. As such, syntactic and semantic watermarking methods are not typically suitable for digital watermarking structured texts and sentences, for example this type of digital watermarking may not be suitable for a database table that may contain a group of numerical values that do not have interconnections to each other.

Other digital watermarking methods include database watermarking methods. Database watermarking methods work on the structure of textual data with support of various techniques, such as least significant bits (LSB), content analysis or partitioning, in order to embed a digital watermark into and extract the digital watermark from the textual data. Many known database watermarking methods rely on a primary key attribute of the database table in the partitioning algorithm. The primary key attribute is often used to compute the partition number indicative of the partition to which a given cell belongs. Due to the heavy reliance on the primary key attribute, database watermarking methods may be vulnerable to deletion or alteration attack as the primary key column can be easily identified and deleted. As such, these types of techniques are not desired, as a suitable digital watermarking method should be resilient to various digital watermark attacks including subset attack, deletion attack, alteration attack and re-type attack.

In the instant application, a number of symbols are used to describe one or more aspects and embodiments. The symbols used herein and the meaning thereof are summarized in TABLE 1 provided below.

TABLE 1

| Symbol | Description |
| --- | --- |
| D | Dataset |
| \|D\| | Number of rows in the dataset D |
| m | Number of partitions in the dataset D |
| W | Watermark (Unique for each recipient) = Recipient ID (Binary value) |
| H(x) | Hash function |
| $S_i$ | $i^{th}$ Partition |
| $P_{ij}$ | Primary key for the cell $C_{ij}$ |
| $A_i$ | $i^{th}$ Attribute of the dataset D |
| $K_s$ | Secret key |
| r | Dataset rows |
| $C_{ij}$ | Cell(i,j) of the dataset D, Cell at column i and row j in the dataset D |
| c | Confidence Coefficient $0 < c < 1$ |
| VT | Voting Threshold |

According to embodiments, the digital watermark is a data string that is unique for each recipient that is to receive the numerical data. According to embodiments, due to the inherent uniqueness of the digital watermarks, each digital watermark can be used as a recipient identifier (ID) which may constitute a set of binary values. In various embodiments, a digital watermark can be a bit string 4 bytes (e.g. 32 bits), and in this embodiment there can be up to 4,294,967,296 unique digital watermarks that can be used as an identifier for each data recipient. Thus a data owner can share their digitally watermarked data with approximately 4.2 billion different data recipients such that each data recipient is uniquely identifiable. According to embodiments, the unique digital watermarks can be based on a per data owner association. It will be readily understood that other bit string configurations are possible for example 2 bytes or 3 bytes, however this will obviously reduce the number of uniquely identifiable data recipients when using a smaller bit string for the digital watermark. As such, each data owner can individually use a digital watermark according to embodiments, thus allowing for the collection of uniquely identifiable recipients of the data from the data owner. In some embodiments, a digital watermark may be extensible to a bit string with more bytes (e.g. greater than 4 bytes) thus can deal with a larger number of data recipients for each data owner.

According to embodiments, the primary key ($P_{i,j}$) for the cell ($C_{i,j}$) is the bit string value of the cell ($C_{i,j}$) with the LSB equal to zero. In the case of float number (i.e. a number with a decimal place), the primary key ($P_{i,j}$) is the bit string value of the cell ($C_{i,j}$) with the LSB having the last digit of the decimal place equal to zero. FIG. 1 illustrates an example structure 100 of the primary key 110 for the cell, in accordance with embodiments. As illustrated in FIG. 1, the primary key 110 includes the LSB 120 and the remaining part of the cell value 130. The value of the LSB 120 would be zero and the value in the remaining part 130 would be the bit string value of the cell without the LSB 120.

Embodiments of the present disclosure embed the digital watermark by modifying the least significant bit (LSB) of structured numerical data (e.g. numerical values). The modification of the LSB may have, if any, a trivial impact on the original data as the LSB modification can minimally change the value of the numerical data (e.g. only one unit up or one unit down). According to embodiments, numerical data may be partitioned using a partitioning process without needing to specify the primary key in the data set. The partitioning process is distinguished from other existing partitioning algorithms in that many existing partitioning algorithms require the primary key to be specified for the data partitioning process.

Figure 2:
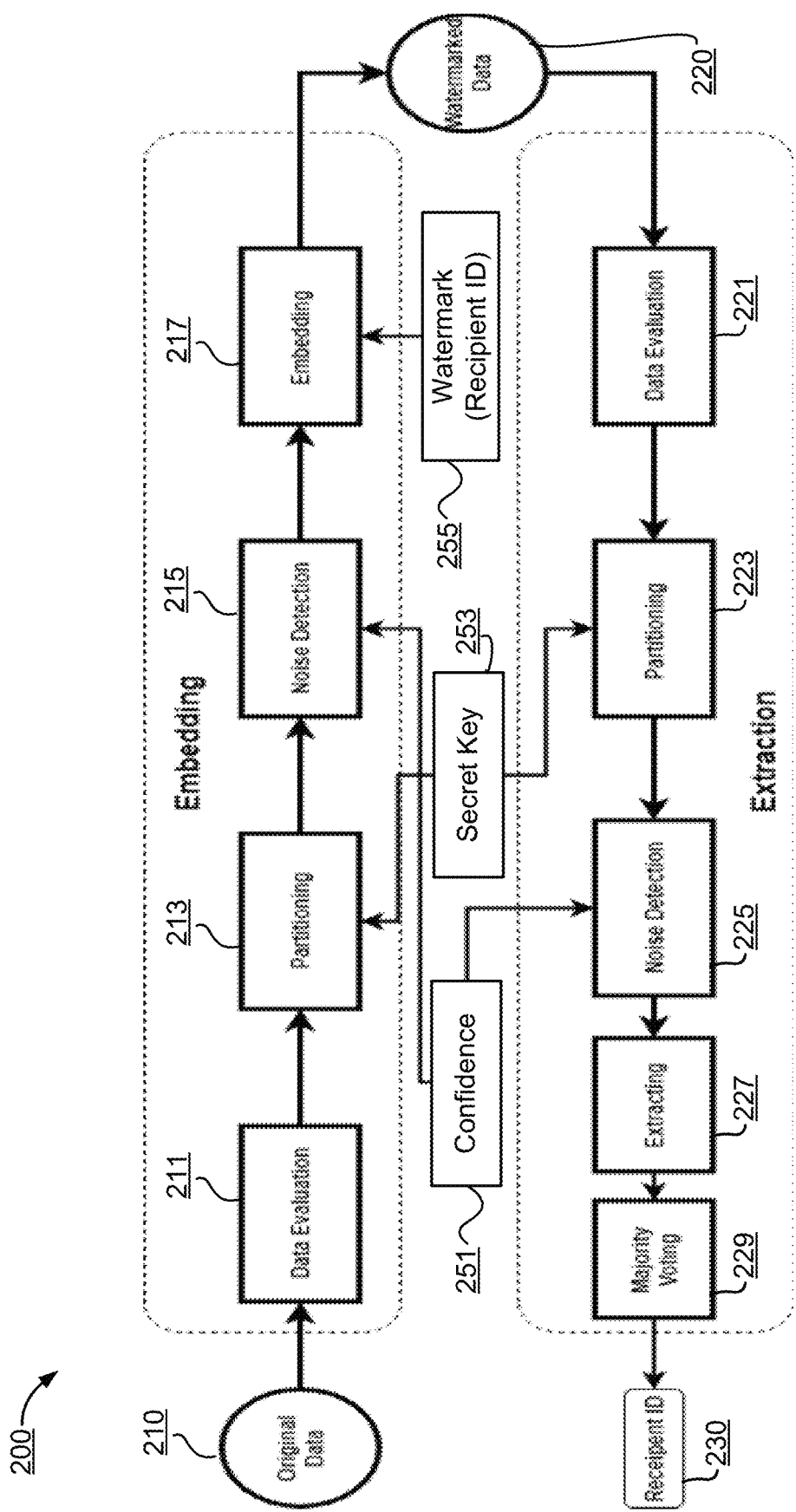
FIG. 2 illustrates an example procedure for embedding and extracting a digital watermark for structured numerical data, in accordance with embodiments.

According to embodiments, when the digital watermark is based on a 4 byte bit string, approximately 4.2 billion unique digital watermarks (e.g. 4,294,967,296 digital watermarks) can be generated and can be embedded and extracted from the numerical data being digitally watermarked. The extracted digital watermarks may be used to uniquely identify each recipient of the digitally watermarked data (e.g. digitally watermarked numerical data). FIG. 2 illustrates an example procedure 200 for embedding and extracting a digital watermark for structured numerical data, in accordance with embodiments.

Referring to FIG. 2, at step 211, the original data 210 (e.g. structured numerical data) is received, and each single column in the original data 210 is assessed to evaluate the feasibility of that column for digital watermarking. For instance, the original data 210 may be assessed to find the columns containing only numerical values with normal distribution. The output of step 211 is a list of attribute columns of the structured numerical data that can be used for digital watermarking in the next steps. Put another way, at step 211, a list of columns feasible for digital watermarking are selected via assessment of the original data 210. For example, a column of data can be determined to be feasible for use for digital watermarking if the distribution of data therein has a defined distribution, for example normal distribution. These types of data distribution can provide for the selection numerical data that may be considered to be data noise in the data distribution, for embedding the digital watermark therein, thus mitigating the impact of digital watermarking on data integrity.

Once the attribute columns that are feasible for digital watermarking (e.g. columns that can be used for digital watermarking) are selected, at step 213, a set of data (e.g. rows in the data set) comprising the selected attribute columns may be divided or partitioned into multiple partitions. The partitioning process may be beneficial, for example in terms of enhancing computational performance, for example when the amount of data comprising the selected attribute columns is large (e.g. a large number of rows with selected attribute columns in the data set). In some embodiments, the partition number for each cell in the selected columns can be calculated, using one or more of the secret key 253 (i.e. $K_s$), the primary key of the cell $C_{ij}$ (i.e. $P_{ij}$) and the number of partitions m, according to Equation 1.

$$\text{Partition}(C_{ij}) = H(K_s \| H(P_{ij} \| K_s)) \bmod m$$

$$m \geq 32 \quad (1)$$

In various embodiments, the number in each cell may be converted into binary format. The primary key for each cell may be equivalent to the converted bit string with LSB equal to zero (0). In various embodiments, the secret key 253 (i.e. $K_s$) may be unique. According to embodiments, the number of partitions is equal to or greater than the number of bits in the recipient ID.

At step 215, noise detection is performed in order to attempt to limit or minimize the number of cells used for digital watermarking while preserving the data statistics of the data set. In various embodiments, a threshold value is used to filter out some cells of the data set in order that only a small portion of the numerical data set is used for digital watermark encoding. Embodiments of this noise detection process are illustrated in FIG. 3.

Figure 3:
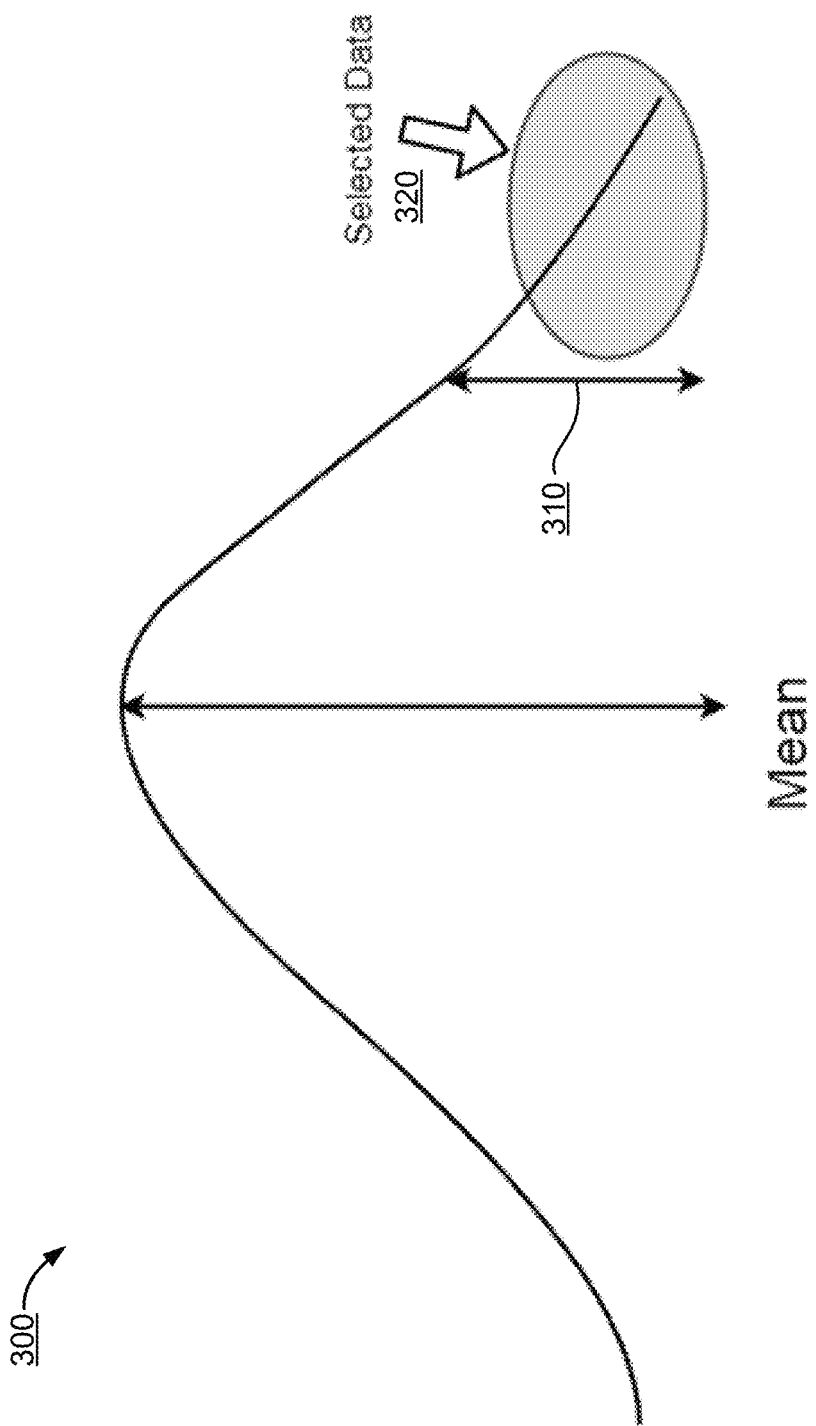
FIG. 3 illustrates an example of numerical data distribution and data selection, in accordance with embodiments.

FIG. 3 illustrates an example of numerical data distribution and data selection for digital watermarking, in accordance with embodiments. Referring to FIG. 3, among the entire numerical data set 300, only numerical data 320 above the threshold value 310 will be selected for digital watermark encoding. In some embodiments, the threshold value 310 may be greater than the mean value of the entire numerical data set 300. For example, this selection of portions of the numerical data that falls within the region of data noise, for example data that is above a threshold relative to the mean of the data, enables the watermarking of this selected portion of the numerical data to substantially minimally impact the integrity of the numerical data set.

According to embodiments, the value of the threshold (e.g. threshold value 310) can be calculated according to Equation 2.

$$T=\mu+c\sigma \quad (2)$$

Regarding Equation 2, $\mu$ refers to the mean of the numerical data set in each partition and $\sigma$ refers to the standard deviation of the numerical data set in that partition and c refers to the confidence coefficient 251. The value of the confidence coefficient 251 is between zero (0) and one (1). According to embodiments, the value of the threshold may be calculated when the LSB for each cell (e.g. LSB of the bit string value of each cell) is equal to zero. Using the calculated threshold, only a small portion of the numerical data set can be selected for digital watermarking which may enable the preservation of the data statistics of the numerical data set. According to embodiments, the selected numerical data (e.g. numerical data 320) may be regarded as noise associated with the numerical data set.

With further reference to FIG. 2, at step 217, the digital watermark is embedded into the selected numerical data, e.g. the numerical data present in the selected cell. For instance, the LSB bit of the selected numerical data (e.g. which may be regard as noise associated with the numerical data set) in each partition $S_i$ is replaced with the ($i^{th}$ mod 32) bit of the digital watermark (e.g. the digital watermark indicative of the recipient ID) 255. When the embedding process 217 is complete, the digitally watermarked data 220 will be generated. This digitally watermarked numerical data can subsequently be provided to the data recipient, wherein the unique digital watermark that was embedded the numerical data is associated with that particular data recipient. In this manner, by the extraction of the digital watermark from the numerical data set, one is capable of identifying the source or recipient who originally received that particular digitally watermarked numerical data set.

The subsequent process is the extraction of digital watermark from a numerical data set. With further reference to FIG. 2, when digitally watermarked data 220 is obtained, the digital watermark (e.g. the unique digital watermark of a recipient which may be considered the recipient ID) is determined through the extraction process recited as steps 221 to 229. According to embodiments, the extraction process is a blind method of extraction, namely the original data is not required for the purpose of extraction of the digital watermark.

At step 221, the entire data set including the digitally watermarked data 220 is obtained, and each single column in the entire data set is assessed to evaluate its feasibility for the extraction process. For instance, the entire data set may be assessed to evaluate the columns and find out whether they contain only numerical values with normal distribution. The output of the step 221 is a list of attribute columns feasible for containing the digital watermark and thus are a candidate for the extraction the embedded watermark. Step 221 is essentially similar to step 211.

Once the attribute columns are identified from which to extract the embedded digital watermark (e.g. columns that can be used for extracting the embedded watermarks) are selected, at step 223, the data set rows of the selected attribute columns may be divided into multiple partitions. In some embodiments, the partitioning process is performed at least in part using the unique secret key 253, the primary key of the cell (i.e. $C_{ij}$) or both.

According to embodiments, the partitioning process step 223 is essentially similar to the partitioning process step 213. Similar to the partitioning process step 213, the partitioning process may be beneficial, for example, in terms of enhancing computation performance, in particular for example when the amount of data comprising the selected attribute columns is large (e.g. a large number of rows with selected attribute columns in the data set). The partition number for each cell in the selected columns can be calculated, using one or more of the secret key 253 (i.e. $K_s$), the primary key of the cell $C_{ij}$ (i.e. $P_{ij}$) and the number of partitions m, according to Equation 3.

$$\text{Partition}(C_{ij})=H(K_s\|H(P_{ij}\|K_s))\bmod m$$

$$m \geq 32 \quad (3)$$

At step 225, noise detection is evaluated in order to identify the numerical data with the embedded digital watermark. The noise detection step 225 is essentially similar to the noise detection step 215. According to embodiments, a threshold value is used to filter out some of the data set in order that substantially only the portion of the data set containing the digital watermark information (e.g. digitally watermarked data 220) is used for digital watermark extraction. The value of the threshold can be calculated according to the formula according to Equation 2 as previously presented in relation to step 215. The output of step 225 can be the data set rows which have been determined as containing the embedded digital watermark (e.g. watermarked data 220).

At step 227, the digital watermark information is extracted from LSB bits of data 220 which has been identified through the above steps as including at least a portion of the digital watermark.

After the watermark information is extracted, majority voting, at step 229, is processed in order to the exact bits of the digital watermark that has been extracted from the digitally watermarked data 220. The majority voting process may be required especially when the data set has been divided into multiple partitions through the partitioning process (e.g. step 225) and thus there are a plurality of digital watermarks present in the numerical data set. For example the step of majority voting or other technique for determining the most likely digital watermark embedded in the particular numerical data set can provide a means for verifying the particular digital watermark. This verification can provide the ability for the selection of the digital watermark, when more than one digital watermarks are extracted from the numerical data set, that is the most likely digital watermark that was originally embedded in the particular numerical data set. It would be readily understood that in a case where more than one digital watermark is extracted from the numerical data set, there is most likely an error in one of these extracted digital watermarks and thus the need for "majority voting" or "verification" of the true identity of the originally embedded digital watermark.

It would be understood that these plurality of digital watermarks in the same numerical data set are the same digital watermarks that were associated with the recipient of the original digitally watermarked numerical data set. According to embodiments, majority voting may be performed during the extraction process in order to detect the correct digital watermark so that the data can be protected from digital watermark attacks such as a data modification attack. For instance, when a portion of the digitally watermarked data is corrupted due to a data modification attack, there remains a plurality of digital watermarks embedded in the numerical data set. As such, the correct digital watermark can be determined by majority voting (e.g. the extracted digital watermark that is present in more data cell is selected). As such, the correct digital watermark can be discovered even if there exists some illicitly modified data in the dataset due to a data modification attach. In various embodiments, to optimize the majority voting process, the voting threshold (VT) may be needed. A selected digital watermark may be verified when the percentage of the majority is greater than the voting threshold. When the digital watermark is verified by the majority voting process, the exact bits of the digital watermark has been determined and thus the recipient ID 230 (namely the identity of the original recipient of the digitally watermarked numerical data set) is obtained.

Figure 4:
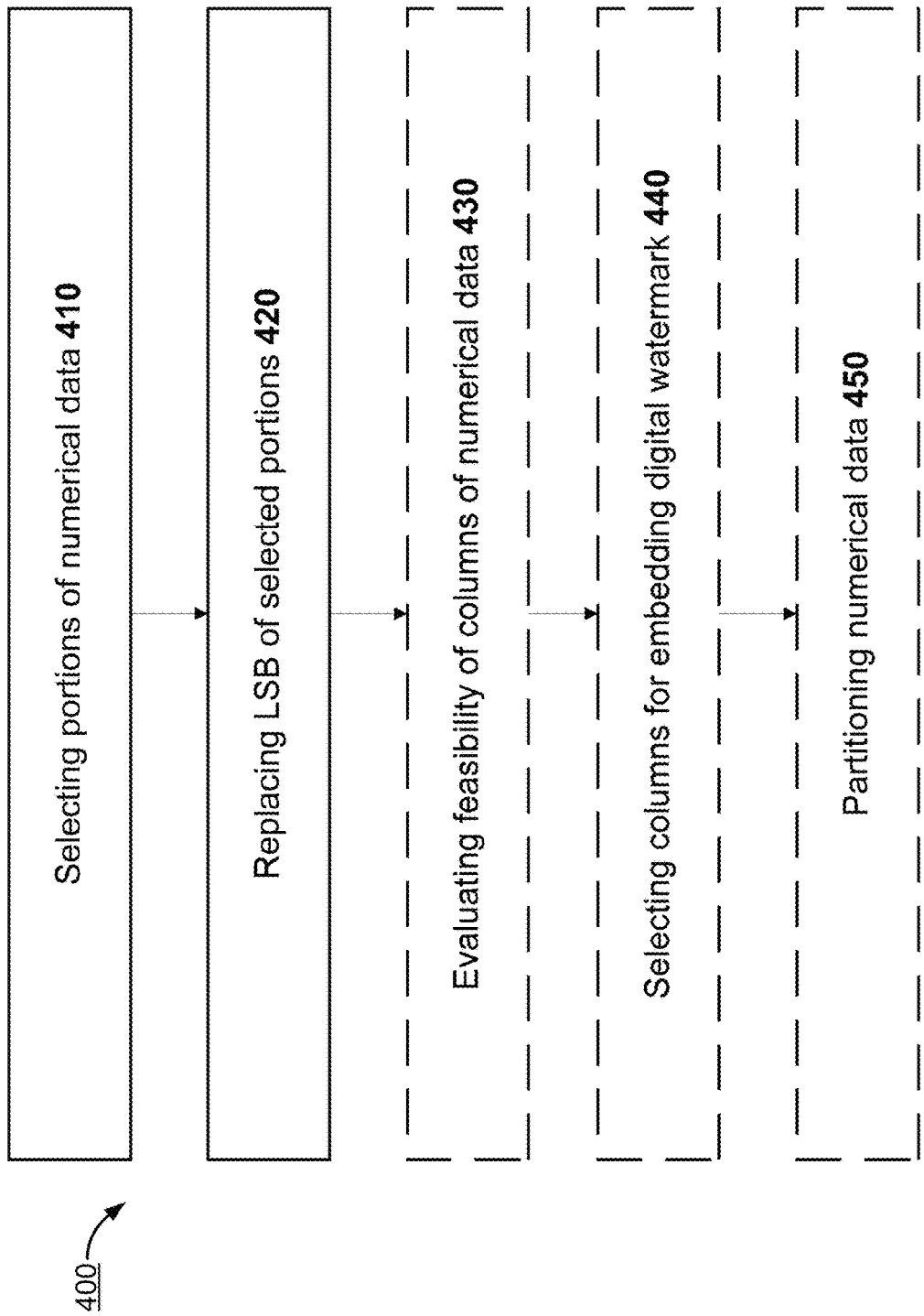
FIG. 4 illustrates a method for embedding a digital watermark into structured numerical data, in accordance with embodiments.

FIG. 4 illustrates a method for embedding a digital watermark into a numerical data set, for example structured numerical data, in accordance with embodiments. The method includes selecting 410 portions of the numerical data set identified as data noise, wherein the selected portions are to be used for embedding the digital watermark into the numerical data set. The digital watermark being unique for each recipient of the numerical data. The method further includes replacing 420 the least significant bit (LSB) of at least some of the selected portions of the numerical data set with at least portion of the digital watermark. In some embodiments, the method includes evaluating 430 feasibility of each column of the numerical data set for embedding the digital watermark and selecting 440 columns of the numerical data set feasible for embedding the digital watermark based on the evaluation. In some embodiments, the method includes partitioning 450 the numerical data set into a plurality of partitions wherein the digital watermark is embedded in each of the partitions.

Figure 5:
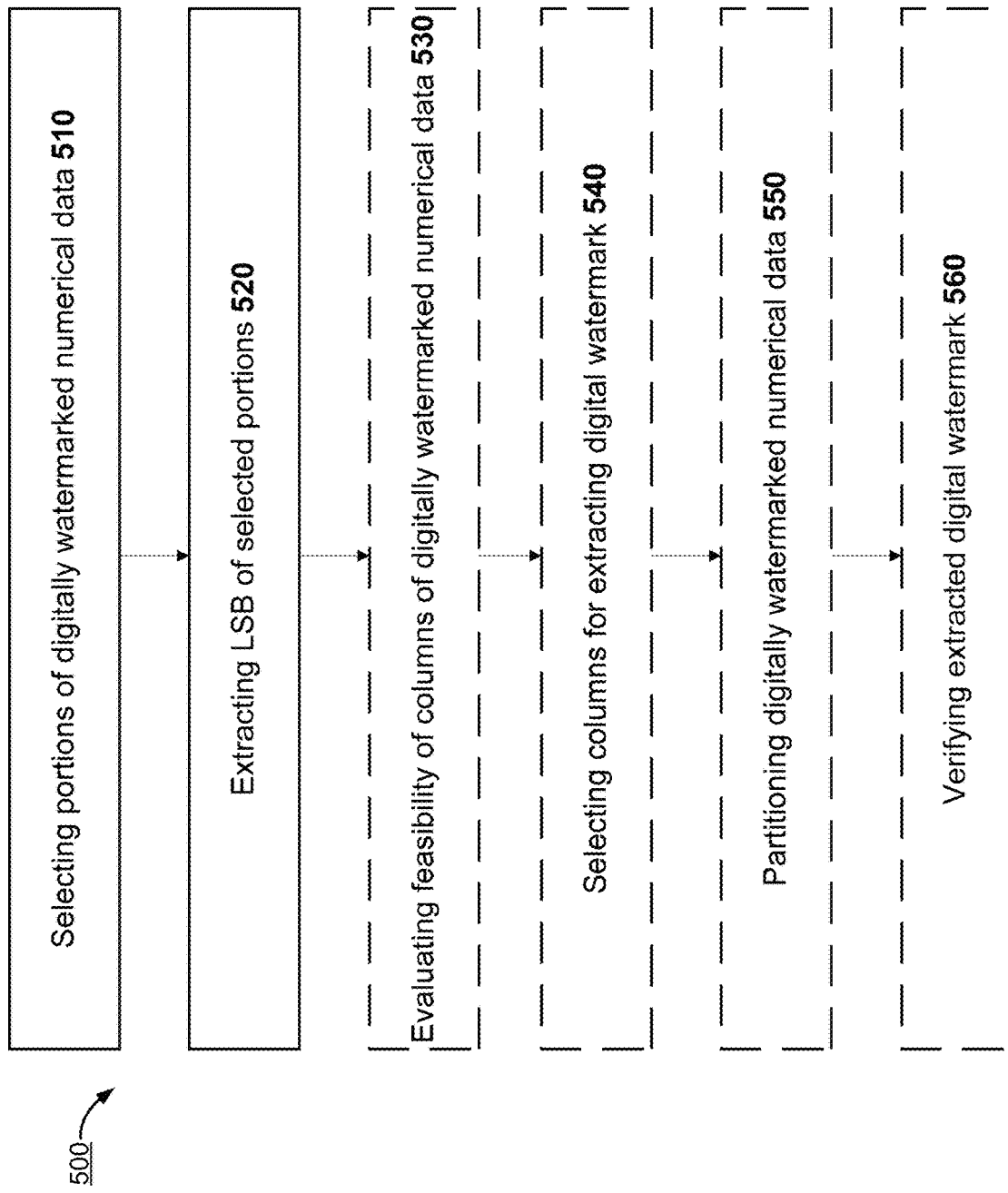
FIG. 5 illustrates a method for extracting a digital watermark from structured numerical data, in accordance with embodiments.

FIG. 5 illustrates a method for extracting a digital watermark from a digitally watermarked numerical data set, for example digitally watermarked structured numerical data, in accordance with embodiments. The method includes selecting 510 portions of the digitally watermarked numerical data set identified as data noise, the selected portions to be used for extracting the digital watermark from the digitally watermarked numerical data set. The digital watermark can be unique for each recipient of the digitally watermarked numerical data. The method further includes extracting 520 at least a portion of the digital watermark from the least significant bit (LSB) of the selected portions of the digitally watermarked numerical data set. In some embodiments, the method further includes evaluating 530 a feasibility of each column of the digitally watermarked data set for including at least a portion of the digital watermark and selecting 540 columns of the digitally watermarked data set feasible for including at least a portion of the digital watermark based on the evaluation. In some embodiments, the method further includes partitioning 550 the digitally watermarked data set into a plurality of partitions, wherein the digital watermark is extracted from each of the partitions. In some embodiments, the method further includes verifying 560 the extracted digital watermark by identifying correct bits of the extracted digital watermark based on a comparison with the digital watermarks extracted from each of the partitions.

Figure 6:
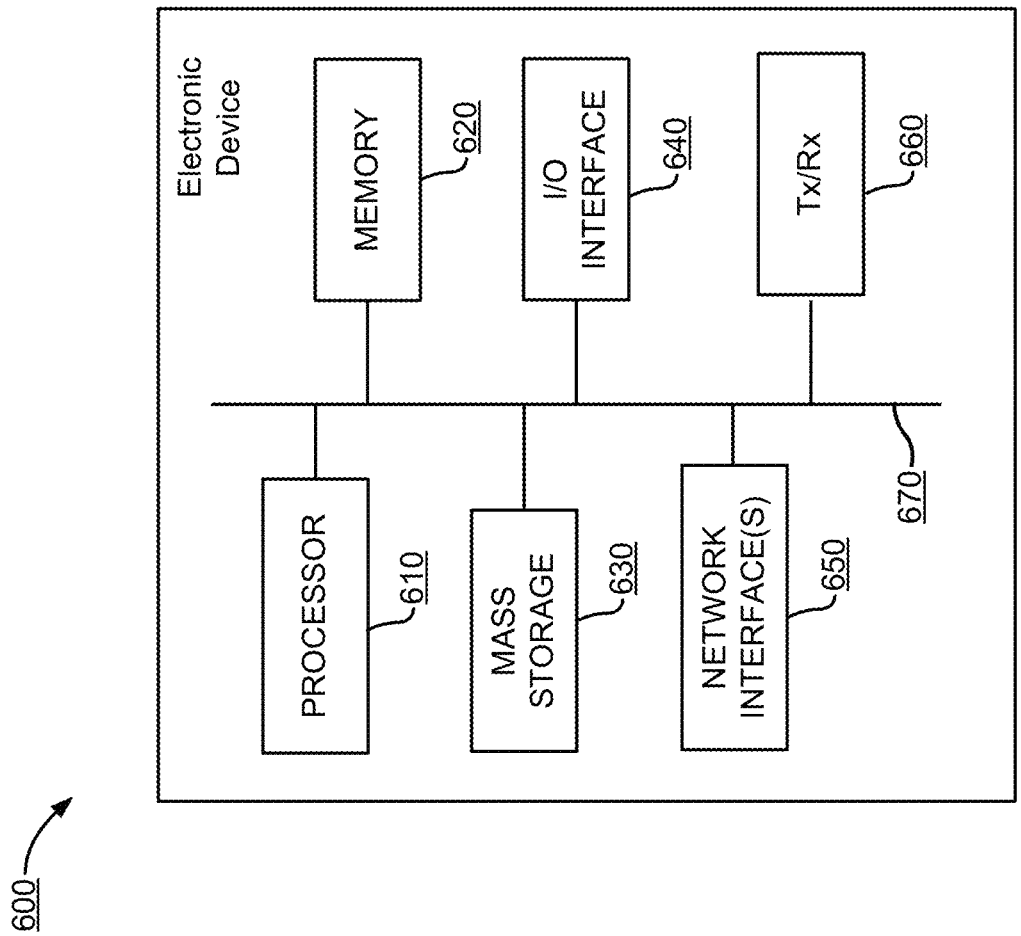
FIG. 6 illustrates, in a schematic diagram, an electronic device in accordance with embodiments.

FIG. 6 is a schematic diagram of an electronic device 600 that may perform any or all of operations of the above methods and features explicitly or implicitly described herein, according to different embodiments. For example, a dedicated hardware capable of executing instructions for operation of the above methods and features may be configured as electronic device 600. The electronic device 600 may be a mobile device or a device forming part of a cell or base station, a server, a database, or other device. In some embodiments, the electronic device may be part of a data-center.

As shown, the device includes a processor 610, such as a Central Processing Unit (CPU) or specialized processors such as a Graphics Processing Unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 2610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for embedding a digital watermark into a numerical data set, the numerical data set for distribution to a plurality of recipients, the method comprising:
   selecting portions of the numerical data set identified as data noise, the selected portions to be used for embedding the digital watermark into the numerical data set, the digital watermark being unique for each of the plurality of recipients;
   replacing the least significant bit (LSB) of at least some of the selected portions of the numerical data set with at least a portion of the digital watermark;
   evaluating feasibility of each column of the numerical data set for embedding the digital watermark; and
   selecting columns of the numerical data set feasible for embedding the digital watermark based on the evaluation.

2. The method of claim 1, further comprising:
   partitioning the numerical data set into a plurality of partitions using one or more of a secret key, a primary key of the numerical data set and a number of the partitions, wherein the digital watermark is embedded in each of the partitions.

3. The method of claim 2, further comprising:
   converting a value in each cell of the numerical data into binary format.

4. The method of claim 1, wherein the digital watermark is a 4 byte bit string.

5. An apparatus for embedding a digital watermark into a numerical data set, the numerical data set for distribution to a plurality of recipients, the apparatus including a processor and a memory storing machine executable instructions thereon, the machine executable instructions, when executed by the processor cause the apparatus to be configured to:
   select portions of the numerical data set identified as data noise, the selected portions to be used for embedding the digital watermark into the numerical data set, the digital watermark being unique for each of the plurality of recipients;
   replace the least significant bit (LSB) of at least some of the selected portions of the numerical data set with at least a portion of the digital watermark;
   evaluate feasibility of each column of the numerical data set for embedding the digital watermark; and
   select columns of the numerical data set feasible for embedding the digital watermark based on the evaluation.

6. The apparatus of claim 5, wherein the machine executable instructions further configure the apparatus to:
   partition the numerical data set into a plurality of partitions using one or more of a secret key, a primary key of the numerical data set and a number of the partitions, wherein the digital watermark is embedded in each of the partitions.

7. The apparatus of claim 6, wherein the machine executable instructions further configure the apparatus to:
   convert a value in each cell of the numerical data into binary format.

8. A method for extracting a digital watermark from a digitally watermarked numerical data set, the numerical data set distributed to a plurality of recipients, the method comprising:
   selecting portions of the digitally watermarked numerical data set identified as data noise, the selected portions to be used for extracting the digital watermark from the digitally watermarked numerical data set, the digital watermark being unique for each of the plurality of recipients;
   extracting at least a portion of the digital watermark from a least significant bit (LSB) of the selected portions of the digitally watermarked numerical data set;
   evaluating a feasibility of each column of the digitally watermarked data set for including at least a portion of the digital watermark; and
   selecting columns of the digitally watermarked data set feasible for including at least a portion of the digital watermark based on the evaluation.

9. The method of claim 8, further comprising:
   partitioning the digitally watermarked data set into a plurality of partitions, wherein the digital watermark is extracted from each of the partitions.

10. The method of claim 9, further comprising:
verifying the extracted digital watermark by identifying correct bits of the extracted digital watermark based on a comparison with the digital watermarks extracted from each of the partitions.

11. The method of claim 8, wherein the digital watermark is blindly extracted from the digitally watermarked data set.

12. The method of claim 8, wherein the digital watermark is a 4 byte long bit string.

13. An apparatus for extracting a digital watermark into a numerical data set, the numerical data set distributed to a plurality of recipients, the apparatus including a processor and a memory storing machine executable instructions thereon, the machine executable instructions, when executed by the processor cause the apparatus to be configured to:
select portions of the digitally watermarked numerical data set identified as data noise, the selected portions to be used for extracting the digital watermark from the digitally watermarked numerical data set, the digital watermark being unique for each of the plurality of recipients;
extract at least a portion of the digital watermark from a least significant bit (LSB) of the selected portions of the digitally watermarked numerical data set;
evaluate a feasibility of each column of the digitally watermarked data set for including at least a portion of the digital watermark; and
select columns of the digitally watermarked data set feasible for including at least a portion of the digital watermark based on the evaluation.

14. The apparatus of claim 13, wherein the machine executable instructions further configure the apparatus to:
partition the digitally watermarked data set into a plurality of partitions, wherein the digital watermark is extracted from each of the partitions.

15. The apparatus of claim 14, wherein the machine executable instructions further configure the apparatus to:
verify the extracted digital watermark by identifying correct bits of the extracted digital watermark based on a comparison with the digital watermarks extracted from each of the partitions.

16. The apparatus of claim 13, wherein the digital watermark is blindly extracted from the digitally watermarked data set.

\* \* \* \* \*